United States Patent
Inoue et al.

(10) Patent No.: US 6,172,723 B1
(45) Date of Patent: Jan. 9, 2001

(54) REFLECTION TYPE LCD PIXEL HAVING OUTER LOW REFLECTIVITY REGION SURROUNDING HIGH REFLECTIVITY REGION UPON WHICH MICROLENS LIGHT IS FOCUSSED

(75) Inventors: Shunsuke Inoue, Yokohama; Katsumi Kurematsu, Hiratsuka; Osamu Koyama, Hachioji, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/188,106

(22) Filed: Nov. 9, 1998

(30) Foreign Application Priority Data

Nov. 10, 1997 (JP) .................................................. 9-307043

(51) Int. Cl.[7] ........................ G02F 1/1335; G02F 1/1333
(52) U.S. Cl. .............................. 349/95; 349/110; 349/113
(58) Field of Search ............................... 349/95, 110, 113

(56) References Cited

U.S. PATENT DOCUMENTS 5,408,345 * 4/1995 Mitsui et al. ............................ 349/110
5,798,805 * 8/1998 Ooi et al. ................................ 349/114

FOREIGN PATENT DOCUMENTS 4-009922 * 1/1992 (JP) ......................................... 349/110

* cited by examiner

Primary Examiner—Walter Malinowski
(74) Attorney, Agent, or Firm—Fitzpatrick, Cella, Harper & Scinto

(57) ABSTRACT

A reflection type liquid crystal display device, having a first substrate having an array of a plurality of light reflecting pixel electrodes, a second substrate having an array of a plurality of microlenses, and liquid crystals sandwiched between the first and second substrates for modulating incident light entering between the first and second substrates and reflected by the pixel electrodes to form an optical display, wherein each of the light reflecting pixel electrodes includes a high reflectivity region formed near at a focal point upon which light incident upon a microlens is focussed, the high reflectivity region reflecting the incident light, and a low reflectivity region formed surrounding the high reflectivity region, the low reflectivity region limiting a reflection of incident light components of stray light to be caused by aberration among light passed through the microlens.

19 Claims, 12 Drawing Sheets

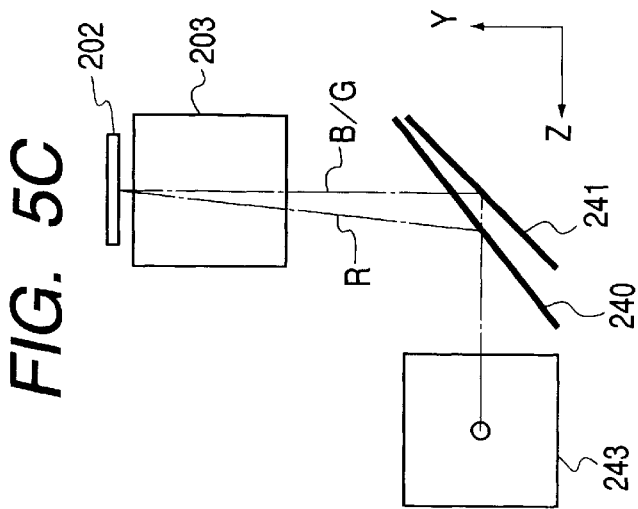
FIG. 5C
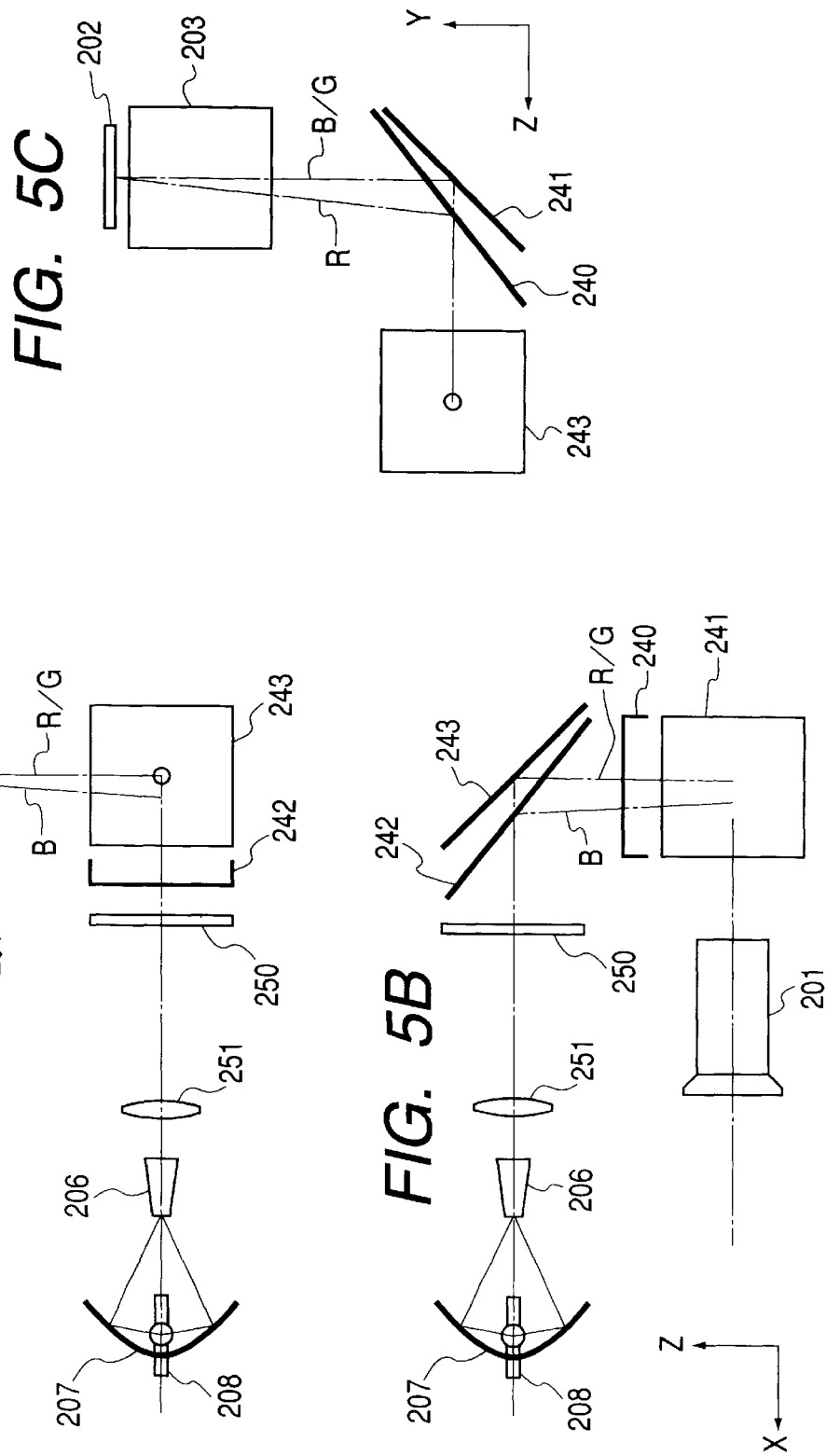
FIG. 5A
FIG. 5B

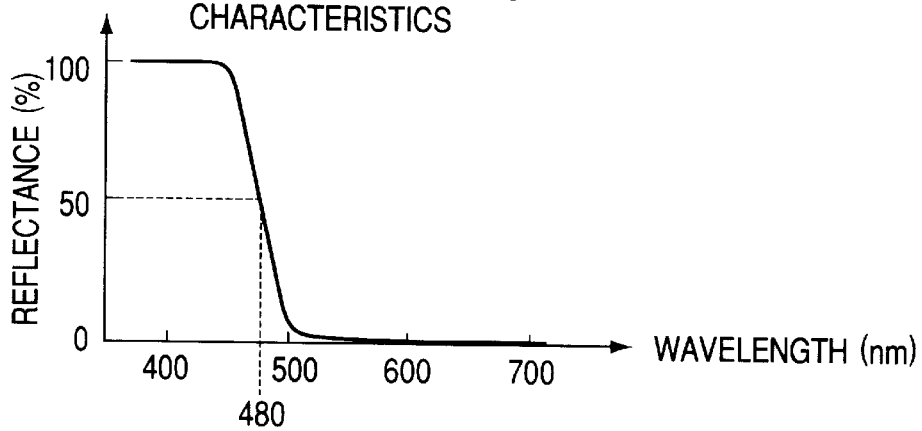
FIG. 6A  242: B REFLECTION DICHROIC MIRROR SPECTRUM REFLECTION CHARACTERISTICS
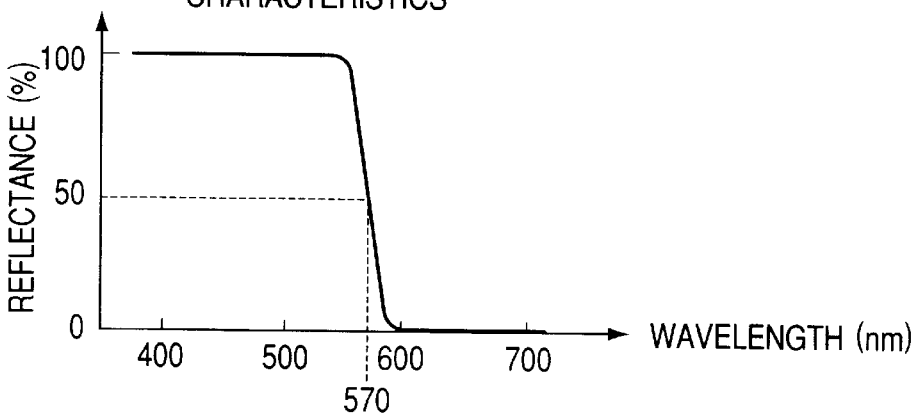
FIG. 6B  241: B/G REFLECTION DICHROIC MIRROR SPECTRUM REFLECTION CHARACTERISTICS
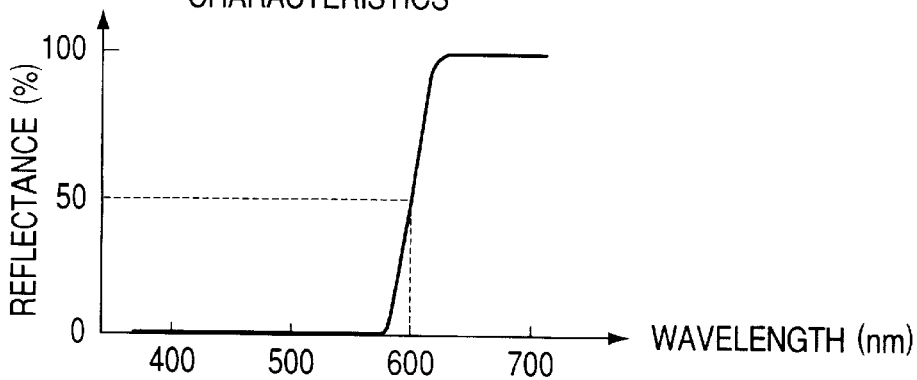
FIG. 6C  240: R REFLECTION DICHROIC MIRROR SPECTRUM REFLECTION CHARACTERISTICS

REFLECTION TYPE LCD PIXEL HAVING OUTER LOW REFLECTIVITY REGION SURROUNDING HIGH REFLECTIVITY REGION UPON WHICH MICROLENS LIGHT IS FOCUSSED

BACKGROUND OF THE INVENTION

1. Field of the Invention

The present invention relates to a reflection type liquid crystal display device which forms an image by modulating light reflected from a reflection type matrix substrate with liquid crystals.

2. Related Background Art

Liquid crystal display devices are presently used as thin display devices for various industrial and commercial apparatuses. Projection type display devices for projecting and magnifying light modulated with liquid crystals are widely used for large screen display devices. A reflection type liquid crystal display device which has a high efficiency of light utilization is expected as a device capable of displaying an image of high precision and brightness.

FIG. 14A is a cross sectional view showing a typical example of a conventional reflection type liquid crystal color display device. The display device has a pair of a transparent substrate 1 and an active matrix substrate 2 between which liquid crystals 3 are sandwiched. Incident light indicated by an arrow to modulated at each pixel with liquid crystals driven on the active matrix substrate, reflected by a reflection electrode 10, projected and magnified to obtain a desired image.

The transparent substrate 1 has a glass substrate 4 on which a color filter array 5 of R (red), G (green), and B (blue) is formed. At the interface with liquid crystals, there are a transparent electrode 8 for applying a voltage and an orientation film 9 laminated with the transparent electrode 8. A microlens array 7 is formed on the color filter array 5 in order to improve the efficiency of light utilization. Each lens has a radius of curvature which makes incident parallel light focus generally upon the reflection electrode 10. In order to cut stray light between pixels, a black matrix 6 is formed to fill the space between adjacent color filters of the color filter array 5.

The above-described conventional display device is, however, associated with the problem that light components not focussed upon the reflection electrode 10 because of aberration of the microlens array 7 and stray light components incident upon the microlens array 7 are mixed with light reflected from the reflection electrode 10 and this mixed light lowers the quality of a projected image.

FIG. 14B shows the details of optical paths of one pixel. Light 20 generally vertically incident upon the substrate 1 is refracted by a microlens 7, focussed upon an approximately central area 26 of the reflection electrode 10, reflected by the reflection electrode 10, again becomes incident upon the microlens 7, and is output as vertical light 21. If the microlens provides incident light of different wavelengths with the same refraction and has a perfect parabolic shape, light of different wavelengths can be focussed upon one focal point 26. However, in practice, the parabolic shape is imperfect and the focal length changes with wavelength (aberration). Therefore, for example, some light propagates along a path 22 and is reflected at a position shifted from the focal point so that it is output along a direction 22 shifted from the vertical direction. Further, light incident along a direction 24 is reflected at a position 28 and output along a is direction 25. Such phenomena are superposed upon at a number of pixels. In addition, there is a variation of shapes of microlenses of respective pixels. Output unnecessary light components are mixed with a normal image so that the contrast and image quality may be lowered by these noise components.

If the size of the reflection electrode is made small in order to solve the above problem, a space between adjacent pixels becomes large so that an electric field in this space does not become vertical to the substrate plane and orientation of liquid crystals may be disturbed. From this reason, the contrast is lowered and defects in an image increase.

SUMMARY OF THE INVENTION

In order to solve the above problem, the invention provides a reflection type liquid crystal display device, comprising: a first substrate having an array of a plurality of light reflecting pixel electrodes; a second substrate having an array of a plurality of microlenses; and liquid crystals sandwiched between the first and second substrates for modulating incident light entering between the first and second substrates and reflected by the pixel electrodes to form an optical display, wherein each of the light reflecting pixel electrodes includes a high reflectivity region formed near at a focal point upon which light incident upon a microlens is focussed, the high reflectivity region reflecting the incident light, and a low reflectivity region formed surrounding the high reflectivity region, the low reflectivity region limiting a reflection of incident light components of stray light to be caused by aberration among light passed through the microlens.

According to the invention, the high reflectivity region reflects main image signal components of the incident light, and the low reflectivity region hardly reflects light components not focussed because of aberration and stray light components, because it has a low reflectivity. Accordingly, the project image has high contrast and high quality and does not contain unnecessary light components other than essential image signals. Since the size of the reflection electrode is the same as that of the conventional reflection electrode, disturbance of orientations of liquid crystals and lowered contrast can be prevented.

According to the present invention, most of light converged by the microlens is applied to the high reflectivity region, light components caused by lens aberration and stray light components among light converged by the microlens are applied to the low reflectivity region.

According to the present invention, light components having the main wavelength incident upon the microlens are focussed upon the high reflectivity region of the reflection electrode, and noise components such as lens aberration light components and stray light components are reflected slightly by the low reflectivity region. Therefore, the contrast of a projected image can be improved and the image quality can be improved.

According to an embodiment of the invention, the high reflectivity region is provided in a central area of each pixel electrode and two-dimensionally surrounded by the low reflectivity region.

According to another embodiment, light components having the main wavelength incident upon the microlenses are focussed upon the high reflectivity region near in generally the central area of the reflection electrode, and aberration light components and stray light components are incident upon the nearby area of the reflection electrode which surrounds the high reflectivity region. Accordingly, without changing the size of the pixel electrode, noise components can be cut, which contributes to improve the contrast of a projected image and the image quality.

According to a further embodiment, the high reflective region is made of a high reflectivity conductive material and the low reflectivity region is made of a low reflectivity conductive material.

According to a still further embodiment, the high and low reflectivity regions are made of conductive materials having different reflectivities. A large difference between two reflectivities allows the contrast of a projected image to be improved.

According to a still further embodiment, the high reflectivity region is made of a conductive material and the low reflectivity region is made of a material laminated on the conductive material, the material having a reflectivity lower than the conductive material.

According to a still further embodiment, the low reflectivity region is made of low reflection material formed in the surface layer of the high reflectivity region. Accordingly, the size of the reflection electrode can be maintained same as the high reflectivity region, while the low reflectivity region with a lowered reflectivity is formed in the surface layer.

According to a still further embodiment, the high reflectivity region has a high reflectivity surface configuration and the low reflectivity region has a low reflectivity surface configuration providing a lower reflectivity than the high reflectivity region.

According to a still further embodiment, a projection type liquid crystal display device is provided which uses the reflection type liquid crystal display device described above.

According to a still further embodiment, the projection type liquid crystal display device comprises at least three liquid crystal panels for three colors wherein blue light is separated by a high reflection mirror and a blue light reflection dichroic mirror, and red and green light are separated by a red light reflection dichroic mirror and a green light/blue light reflection dichroic mirror to illuminate each liquid crystal panel.

BRIEF DESCRIPTION OF THE DRAWINGS

FIGS. 5A, 5B and 5C are schematic diagrams illustrating the optical configuration of the projection type liquid crystal display device of the second embodiment.

FIGS. 6A, 6B and 6C show the spectrum reflection characteristics of dichroic mirrors of the second embodiment.

DETAILED DESCRIPTION OF THE PREFERRED EMBODIMENTS

Embodiments of the invention will be described with reference to the accompanying drawings.

(First Embodiment)

Figure 1A:
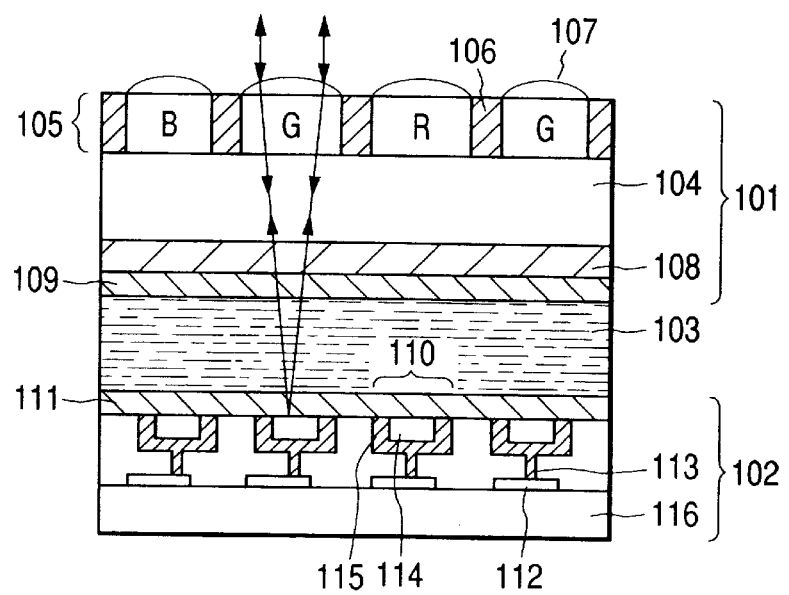
FIG. 1A is a schematic cross sectional view of a liquid crystal display device according to a first embodiment of the invention.

FIG. 1A is a schematic diagram showing the structure of a reflection type liquid crystal color display device using a microlens array according to the first embodiment of the invention. A transparent substrate 101 is constituted of: a microlens array 107 for refracting incident light and reflection light; a color filter array 105 for color modulation; a black matrix 106 for cutting light incident upon a space between adjacent color filters; a glass substrate 104 of 50 to 1500 $\mu$m in thickness for supporting the transparent substrate 101; a transparent electrode 108 made of ITO or the like; and a transparent substrate side orientation film 109 for orientating liquid crystals. An active matrix substrate 102 is constituted of: a silicon or glass substrate 116; switching transistors 112 formed on the substrate 116; pixel reflection electrodes 110 connected to the transistors 112 via through holes 113; and an active matrix substrate side orientation film 111 formed on the surface of the pixel reflection electrodes 110. Liquid crystal material 103 of 1 to 15 $\mu$m in thickness is sandwiched between the transparent substrate 101 and active matrix substrate 102. The liquid crystal material 103 is, for example, twist nematic liquid crystals.

Figure 1B:
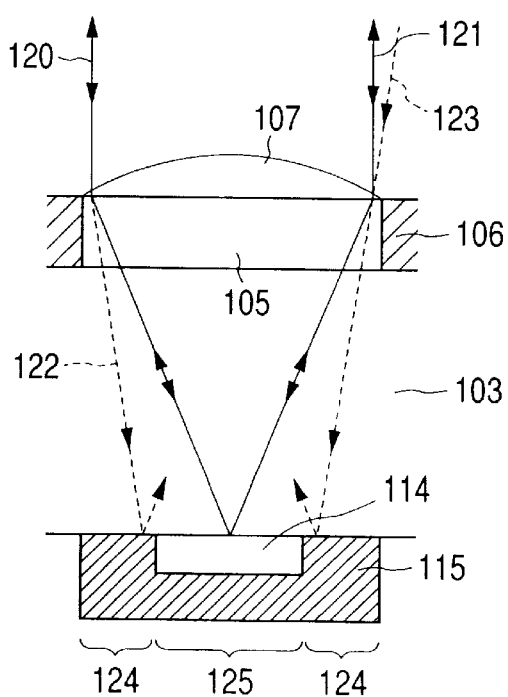
FIG. 1B shows the details of optical paths of one pixel of the liquid crystal display device shown in FIG. 1A.

FIG. 1B is an enlarged view showing one pixel reflection electrode 110 and optical paths of incident light. The pixel reflection electrode 110 has a high reflection region 125 made of high reflectivity metal 114 such as Al and Al—Si alloy and a low reflection region 124 surrounding the high reflection region 125 and made of low reflectivity metal 115.

The reflectivity of each of the high and low reflectivity regions is determined depending upon an optical reflectivity of the metal material of each region and the conditions of each region such as a surface smoothness. In the present invention, the optical reflectivity of the high reflection region is 100 to 60%, or preferably 100 to 80%, whereas the optical reflectivity of the low reflection region is 50% or smaller, or preferably 30% or smaller.

The material of the low reflectivity metal 115 may be Ti, TiN, Cr, Mo, W, or alloy thereof added with silicon. The surfaces of the pixel reflection electrodes 110 are subject to chemical mechanical polishing (CMP) to make the surface of the high reflectivity metal 114 very flat (e.g., surface irregularity of 50 nm or smaller) and make it have a high reflectivity (larger than 90%). An area ratio of the high reflectivity region 125 to the low reflectivity region 124 can be optimized in accordance with a spot size of a normal incident light beam which is broadened by the influences of aberration of each microlens, variation in focal depths, bonding precision between the transparent substrate 101 and active matrix substrate 102, and the like.

In this embodiment, the width of the high reflectivity region 125 was set to 10 $\mu$m, and that of the low reflectivity region 124 was set to 2 $\mu$m. A normal incident light beam propagating along optical paths 120 and 121, is focussed upon generally the center of the high reflectivity metal 114 and reflected toward the direction opposite to the incident direction. Aberration light components in unnecessary light beams are incident upon the low reflectivity region 124 at the position indicated at 122, for example, so that a very small fraction thereof is reflected. In this embodiment, Ti was used as the low reflection metal and a surface reflectivity of 20% was obtained. Stray components indicated at 23 are also incident upon the low reflection region 124, and only a very small fraction thereof was reflected.

Figure 2:
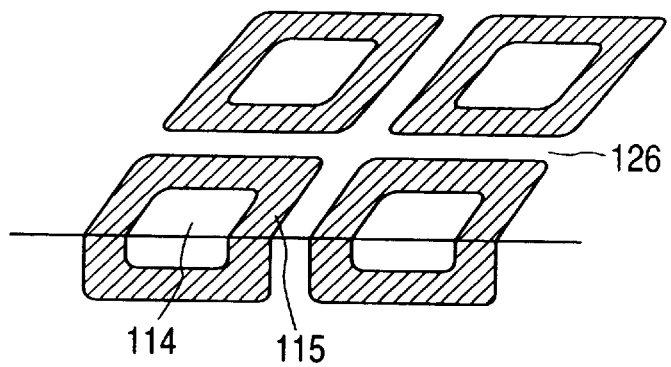
FIG. 2 is an enlarged perspective view of reflection electrodes of a liquid crystal display device of the invention.

FIG. 2 is a perspective view of pixel reflection electrodes. The high reflection metal 114 is two-dimensionally surrounded with the low reflection metal 115. The width of a pixel separation region 126 was able to be set to a value like a conventional pixel separation region. A contrast lowered by a disturbance of orientation of liquid crystals was not observed at all.

Figure 3A:
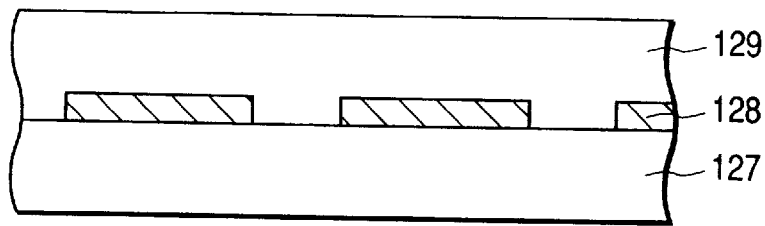
FIGS. 3A, 3B, 3C and 3D are cross sectional views illustrating a method of manufacturing a liquid crystal display device of the invention.
Figure 3B:
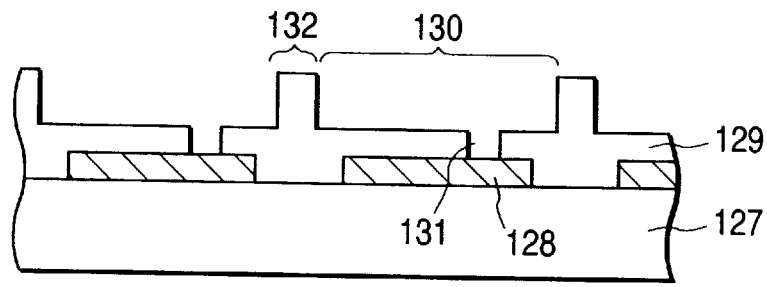
Figure 3C:
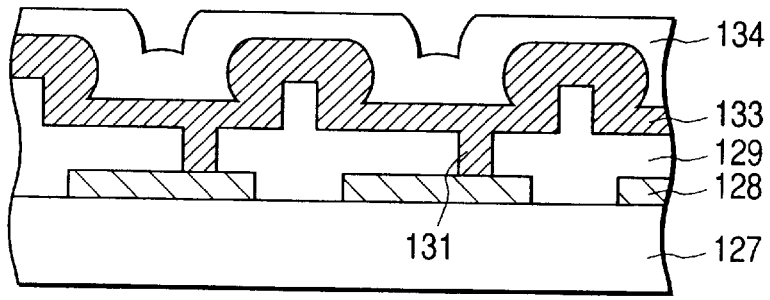

FIGS. 3A to 3D illustrate a method of forming a pixel reflection electrode on the active matrix substrate. As shown in the cross sectional view of FIG. 3A, on a silicon or glass substrate 127, thin film transistors 128 were formed in a matrix pattern. An approximately flat interlayer insulating film 129 was deposited on the substrate 127, covering the thin film transistors 128. In this embodiment, although the thin film transistors were used as switching transistors, single crystal bulk transistors may be formed in a surface layer of the silicon substrate 127. Next, as shown in FIG. 3B, pixel electrode regions 130 and through holes 131 were formed in the interlayer insulating film 129 through dry etching to leave pixel separation regions 132. Thereafter, as shown in FIG. 3C, low reflection metal 133 was deposited through sputtering and then high reflection metal 134 was deposited through sputtering.

In this embodiment, both the low and high reflection metals were deposited to a thickness of 1 $\mu$m (FIG. 3C).

Figure 3D:
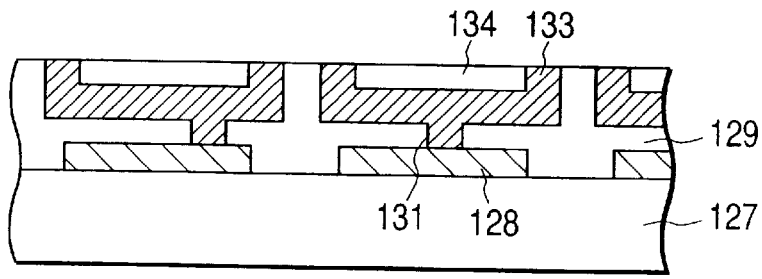

Thereafter, as shown in FIG. 3D, the surface of the substrate was planarized through CMP to set the width of the low reflection metal to several hundred nm or more at the surface level.

As described above, according to the first embodiment of the reflection type liquid crystal color display device using a microlens array, since orientation of liquid crystals near the pixel separation region is not disturbed, a contrast to be lowered by aberration of microlenses and stray light can be prevented. The image quality of the reflection type display device can therefore be improved.

Further, the reflection type display device can be manufactured by hardly complicating the conventional manufacture processes as described above.

(Second Embodiment)

Figure 4:
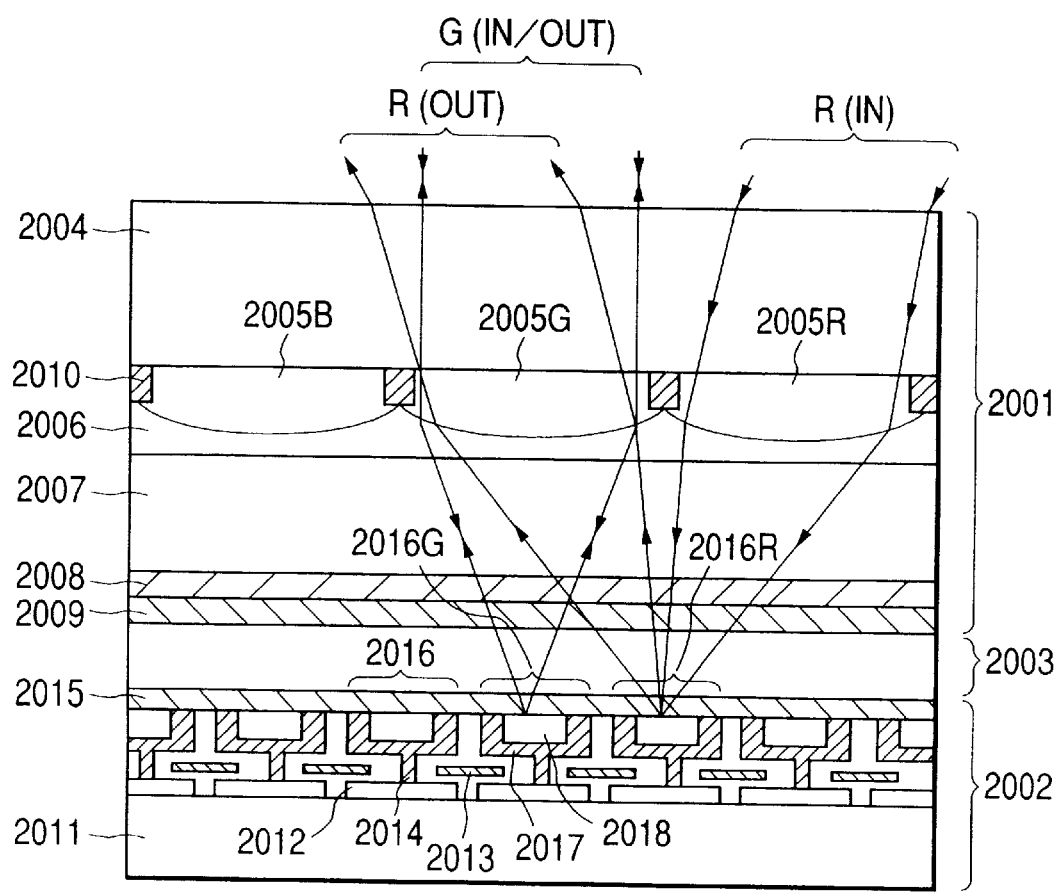
FIG. 4 is a schematic cross sectional view of a projection type liquid crystal display device according to a second embodiment of the invention.

FIG. 4 is a cross sectional view showing the structure of a liquid crystal display device according to the second embodiment. This embodiment is applied to a single panel—reflection type color display device to be used as a projector.

A glass substrate 2001 is constituted of: a microlens array 2005 for refracting incident light and reflection light; a support glass substrate 2004 for supporting the glass substrate 2001; a black matrix 2010 for cutting light incident upon a space between adjacent microlenses; a low reflectivity layer 2006 for planarizing the upper surface of the lens array; a sheet glass 2007; a transparent electrode 2008 made of ITO or the like; and a glass substrate side orientation film 2009 for orientating liquid crystals.

The microlens array 2005 is formed on the surface of the support glass (alkali based glass) substrate 2004 by a so-called ion exchange method. The microlens array 2005 is two-dimensionally disposed at a pitch two times as large as that of pixel reflection electrodes 2016. A liquid crystal layer 2003 is made of nematic liquid crystals of an ECB (Electrically Controlled Birefringence) mode such as DAP (Deformation of Aligned Phase) and HAN (Hybrid Aligned Nematic) suitable for a reflection type display device. Liquid crystals in the liquid crystal layer are maintained to have a desired orientation by using an orientation film 2009 at a glass substrate side and an orientation film 2015 at an active matrix side. The pixel reflection electrode 2016 has a high reflectivity metal region 2018 (Al) and a low reflectivity metal region 2017 (e.g., Ti) surrounding the region 2018, and serves also as a reflection mirror. The pixel reflection electrode 2016 is subjected to CMP at the final process after the electrode is patterned, in order to improve the surface conditions and a reflectivity.

An active matrix substrate 2002 is constituted of: a silicon or glass substrate 2011; switching transistors 2012 formed on the substrate 2011; the pixel reflection electrodes 2016 which are driven by the transistors 2012 via through holes 2014; and light shielding films 2013 formed under and between adjacent pixel reflection electrodes 2016 for preventing incident light from entering the switching transistors.

The surface of the high reflection metal 2018 of Al, Al alloy or the like of the pixel reflection electrode 2016 is exposed in the area near the center of the electrode 2016 and the low reflection metal 2017 surrounds the high reflection metal 2018.

The active matrix substrate 2002 formed on the silicon semiconductor substrate 2011 is provided with a semiconductor drive circuit for driving the pixel reflection electrodes 2016 in an active matrix way. Unrepresented gate line drivers (vertical registers and the like) and signal line drivers (horizontal registers and the like) are provided in the peripheral area of the semiconductor matrix drive circuit (the details will be later given). These peripheral drivers and the active matrix drive circuit are configured so as to write each RGB (red, green, blue light) primary color image signal into each RGB pixel. Although each pixel reflection electrode 2016 is not provided with a color filter, each RGB pixel is discriminated by the primary color image signal written by the active matrix drive circuit to thereby form a desired RGB pixel array to be later described.

Consider now G light illuminating to a liquid crystal panel. G light is polarized by a polarizing beam splitter and thereafter applied vertically to the liquid crystal panel. An example of G light incident upon one microlens 2010 is indicated by an arrow G (in/out). As shown, the G light is converged by the microlens and illuminates a G pixel reflection electrode 2016G. The G light is then reflected by the G pixel reflection electrode 2016G and output via the same microlens 2005G to the outside of the panel. While the G light reciprocates in the liquid crystal layer 2003, the G light is modulated by the operation of liquid crystals driven by the electric field between the pixel electrode 2016G and transparent electrode 2008 upon application of a signal voltage to the pixel electrode 2016G, and thereafter output to the outside of the liquid crystal panel.

Next, consider R light obliquely incident upon the liquid crystal panel. The R light is also polarized by the polarizing beam splitter. For example, the R light incident upon the microlens 2005R is converged by the microlens 2005R and illuminates the R pixel electrode 2016R shifted to the left from the position just under the microlens 2005R, as shown by an arrow R (in). The R light is reflected by the R pixel electrode 2016R and output via the next microlens 2005G to the outside of the panel, as shown by an arrow R (out). In this case, the R light is modulated by the operation of liquid crystals driven by the electric field between the pixel electrode 2016R and transparent electrode 2008 upon application of a signal voltage to the pixel electrode 2016R, and thereafter output to the outside of the liquid crystal panel to return to the polarizing beam splitter and be projected as a portion of image light, in quite the same manner as the above-described G light. In FIG. 4, although the G light and R light incident upon the pixel reflection electrodes 2016G and 2016R are shown partially superposed and interfered with each other, such an interference does not occur irrespective of the pixel size. This is because the thickness of the liquid crystal layer is shown exaggerated in FIG. 4 and the actual thickness of the liquid crystal layer is thinner than 5 $\mu$m which is very thin as compared to the thickness of 50 to 100 $\mu$m of the sheet glass 2007.

Most of the G light and R light are reflected by the high reflection metal region 2018 near the center of the pixel reflection electrode 2016. Aberration and stray light components are incident upon the surface of the low reflection metal region 2017 and are hardly reflected similar to the first embodiment. A high contrast and high quality image can therefore be obtained.

Figure 7:
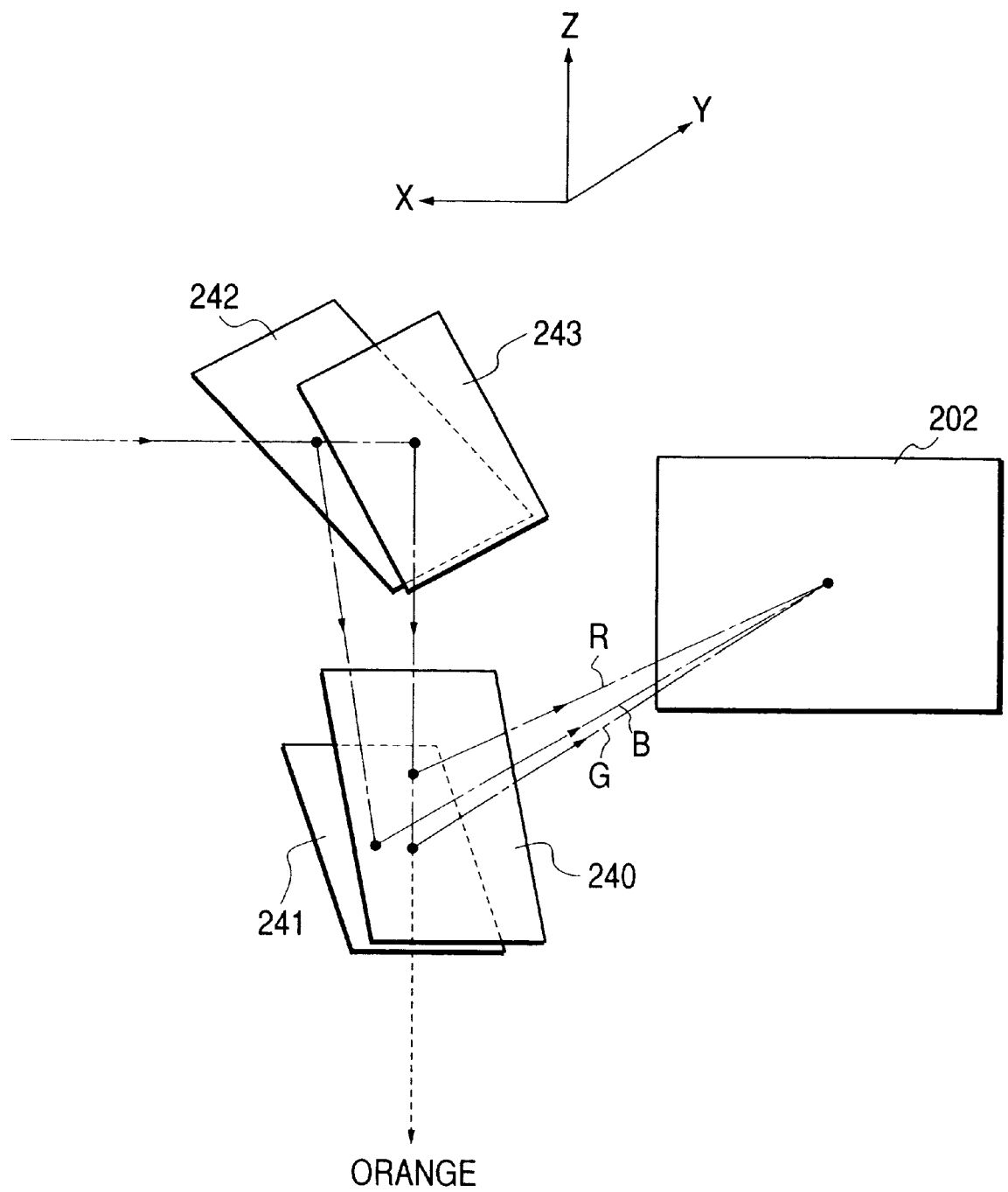
FIG. 7 is a schematic diagram illustrating the three-dimension layout of dichroic mirrors of the second embodiment.

FIGS. 5A to 5C show the configuration of an optical system of a reflection type liquid crystal display device of the embodiment. FIG. 5A is a top view, FIG. 5B is a front view, and FIG. 5C is a side view, respectively of the optical system. In FIGS. 5A to 5C, reference numeral 202 represents the liquid crystal panel of the embodiment, reference numeral 203 represents a polarizing beam splitter (PBS), reference numeral 240 represents an R reflection dichroic mirror, reference numeral 241 represents a B/G reflection dichroic mirror, reference numeral 242 represents a B reflection dichroic mirror, reference numeral 243 represents a high reflection mirror for reflecting light of all colors, reference numeral 250 represents a Fresnel's lens, reference numeral 251 represents a convex lens, reference numeral 206 represents a rod type integrator, reference numeral 207 represents an ellipsoidal reflector, and reference numeral 208 represents an arc lamp such as metal halide and UHP. The R reflection dichroic mirror 240, B/G reflection dichroic mirror 241, and B reflection dichroic mirror 242 have the spectrum reflection characteristics shown in FIGS. 6A to 6C, respectively. These dichroic mirrors together with the high reflection mirror 243 are three-dimensionally disposed as shown in the perspective view of FIG. 7, and separate white illumination light into RGS colors to make each primary color illuminate the liquid crystal panel 202 in three-dimensionally different directions.

The optical path of light will be described sequentially. First, white light output from the lamp 208 is converged by the ellipsoidal reflector 208 to an inlet of the integrator 206 placed in front of the reflector 207. As the light propagates with repetitive reflections in the integrator 206, the spatial intensity distribution of light fluxes is made uniform. The light fluxes output from the integrator 206 are made parallel light fluxes relative to the x-axis negative direction by the convex lens 251 and Fresnel's lens 250 and reach the B reflection dichroic mirror 242. The B reflection dichroic mirror 242 reflects only B light which propagates along the z-axis negative direction or downward (as viewed in the front view of FIG. 5B) toward the R reflection dichroic mirror 240 at a predetermined angle relative to the z-axis. The R/G light other than the B light passes through the B reflection dichroic mirror 242 and is reflected by the high reflection mirror 243 at a right angle along the z-axis negative direction or downward toward the R reflection dichroic mirror 240. As viewed in the front view of FIG. 5B, the B reflection dichroic mirror 242 and high reflection mirror 243 are both disposed to reflect the light fluxes (along the negative x-axis) from the integrator 206 along the z-axis negative direction (downward), and the high reflection mirror 243 has an inclination angle of 45° in the x-y plane about the rotation axis along the y-axis direction. The B reflection dichroic mirror 242 has an inclination angle smaller than 45° in the x-y plane about the rotation axis along the y-axis direction. Therefore, although the R/G light reflected by the high reflection mirror 243 is reflected at a right angle along the z-axis negative direction, the B light reflected by the B reflection dichroic mirror 242 propagates downward at the predetermined angle (tilt in the x-z plane) relative to the z-axis direction. In order to make the illumination areas on the liquid crystal panel 202 of the B light and R/G light be coincident with each other, the shift amount and tilt amount of the high reflection mirror 243 and B reflection dichroic mirror 242 are selected so as to make the principal light flux of each color light intersect above the liquid crystal panel.

Next, the R/G/B light fluxes propagating downward (along the negative z-axis) reach the R reflection dichroic mirror 240 and B/G reflection dichroic mirror 241 which are positioned under the B reflection dichroic mirror 242 and high reflection mirror 243. The B/G reflection dichroic mirror 241 is disposed at an inclination angle of 45° relative to the x-z plane about the rotation axis along the x-axis direction, and the high reflection mirror 243 is disposed at an inclination angle smaller than 45° relative to the x-z plane about the rotation axis along the x-axis direction. Therefore, of the R/G/B light fluxes, the B/G light fluxes pass through the R reflection dichroic mirror 240, are reflected by the B/G reflection dichroic mirror 241 at a right angle along the positive y-axis direction, polarized by PBS 203, and thereafter illuminate the liquid crystal panel 202 disposed in parallel with the x-z plane. Of the B/G light fluxes, the B light propagates at the predetermined angle (tilt in the x-z plane) relative to the x-axis direction. Therefore, after the B light is reflected by the B/G reflection dichroic mirror 241, it maintains a predetermined angle (tilt in the x-y plane) relative to the y-axis direction and illuminates the liquid crystal panel 202 at an incident angle of this predetermined angle. The G light is reflected by the B/G reflection dichroic mirror 241 at a right angle along the positive y-axis direction, polarized by PBS 203, and illuminates the liquid crystal panel 202 at an incident angle of 0°, i.e. vertically. The R light is reflected by the R reflection dichroic mirror 240 disposed upstream of the B/G reflection dichroic mirror 241 along the positive y-axis at a predetermined angle (tilt in the y-z plane) relative to the y-axis direction as shown in FIG. 5C (side view), polarized by PBS 203, and illuminates the liquid crystal panel 202 at an incident angle (a direction in the y-z plane) of this predetermined angle relative to the y-axis direction. Similar to the above, in order to make the illumination areas on the liquid crystal panel 202 of the R/G/B light fluxes be coincident with each other, the shift amount and tilt amount of the B/G reflection dichroic mirror 241 and R reflection dichroic mirror 240 are selected so as to make the principal light flux of each color light intersect above the liquid crystal panel. As shown in FIGS. 6A to 6C, the cut wavelength of the B/G reflection dichroic mirror 241 is 570 nm, and that of the R reflection dichroic mirror 240 is 600 nm. Therefore, unnecessary orange color light passes through the B/G reflection dichroic mirror 241 and is discarded.

As will be later described, each RGB light is reflected and polarization-modulated by the liquid crystal panel 202, and returns to PBS 203 whose PBS surface 203a reflects the light fluxes along the positive x-direction to form image light. This image light passes through the projector lens 201 and projected on an unrepresented screen as a magnified image. Since each RGB light illuminating the liquid crystal panel 202 has a different incident angle, the RGB light reflected from the liquid crystal panel 202 has a different output angle. In order to receive all the light fluxes of different angles, the projector lens 1 having a sufficiently large lens diameter and numerical aperture is used. However, an inclination of light fluxes of respective colors incident upon the projector lens 201 is made parallel because they pass through the microlens twice, so that a constant incident angle of the liquid crystal panel 202 can be maintained. In a transmission type liquid crystal display device, light fluxes output from the liquid crystal panel are made very broad by being enhanced by the convergence function of the microlens. Therefore, in order to receive these light fluxes, the projector lens is required to have a larger numerical aperture and becomes expensive. However, in this embodiment, the expansion of the light fluxes output from the liquid crystal panel 202 is relatively small. Therefore, even with a projector lens having a small numerical aperture, a sufficiently bright image can be projected upon the screen and a more inexpensive projector lens can be used.

Figure 8A:
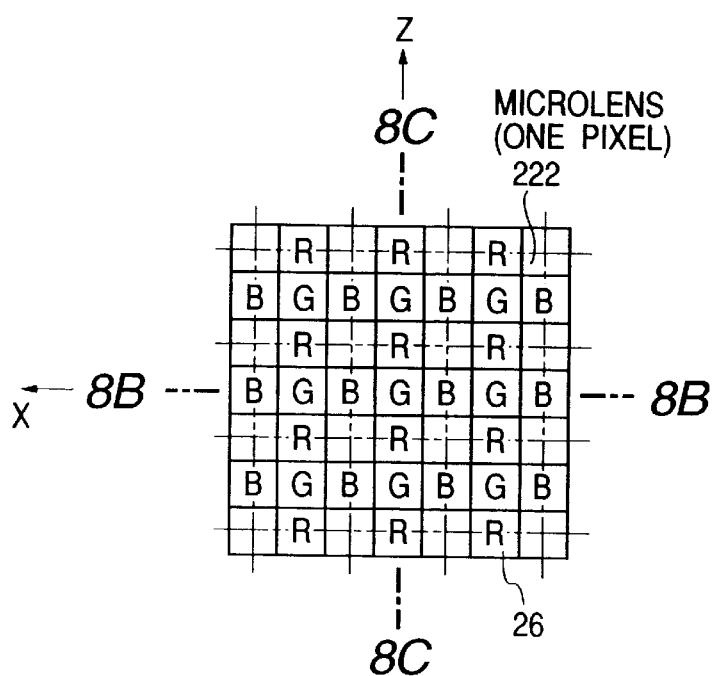
FIGS. 8A, 8B and 8C are a plan view and cross sectional views of a liquid crystal panel of the second embodiment.
Figure 8C:
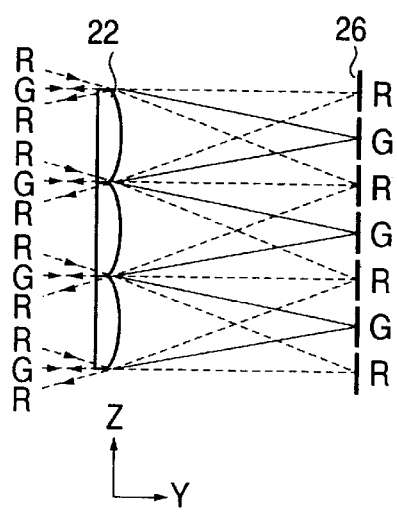
Figure 8B:
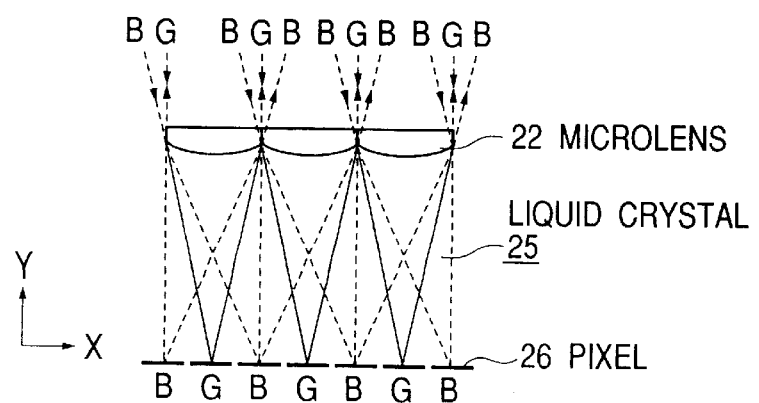

FIGS. 8A to 8C illustrate a principle of color separation and color synthesis according to the embodiment. FIG. 8A is a schematic top view of the liquid crystal panel 202, and FIGS. 8B and 8C are schematic cross sectional views taken along lines 8B—8B and 8C—8C in FIG. 8A, respectively. FIG. 8C shows the y-z cross section and corresponds to FIG. 7. FIG. 8C illustrates incidence and output conditions of the G light and R light incident upon each microlens 222. As seen from FIG. 8C, each G pixel electrode is disposed just under the center of each microlens 222, and each R pixel electrode is disposed just under the boundary between adjacent microlenses. It is therefore preferable to set the incident angle of the R light so that tan θ of the incident angle becomes equal to a ratio of the pixel pitch (between B and R pixels) to a distance between the microlens and pixel electrode. FIG. 8B shows the x-y cross section. In this x-y cross section, B and G pixel electrodes are alternately disposed as shown in FIG. 8C. Each G pixel electrode is disposed Just under the center of each microlens, and each B pixel electrode is disposed just under the boundary between adjacent microlenses. The B light illuminating the liquid crystal panel becomes incident along an oblique direction relative to the x-y cross section after it is polarized by PBS 203, as described earlier. Therefore, quite similar to the R light, the B light incident upon each microlens is reflected by the B pixel electrode and output from the adjacent microlens in the x-axis direction, as shown in FIG. 8B. Modulation by liquid crystals above the B pixel electrode and projection of the B light output from the liquid crystal panel are similar to those described with the G and R light fluxes. Each B pixel electrode is disposed just under the boundary between adjacent microlenses. Similar to the R light, it is therefore preferable to set the incident angle of the B light relative to the liquid crystal panel so that tan e of the incident angle becomes equal to a ratio of the pixel pitch (between G and B pixels) to a distance between the microlens and pixel electrode. In the liquid crystal panel of this embodiment, the order of RGB pixels are RGRGRG, . . . in the z-axis direction and BGBGBG, . . . in the x-axis direction. Such a layout of RGB pixels is shown in the top view of FIG. 8A. The vertical and horizontal sides of each pixel are about halves of those of the microlens, and the pixel pitches are also about halves of the microlens pitches in both the x- and z-axis directions. The G pixel is disposed just under the center of the microlens, the R pixel is disposed between adjacent G pixels in the z-axis direction and at the boundary between adjacent microlenses, and the B pixel is disposed between adjacent G pixels in the x-axis direction and at the boundary between adjacent microlenses. The shape of one microlens is rectangular (having sides of a twofold of those of the pixel).

Figure 9A:
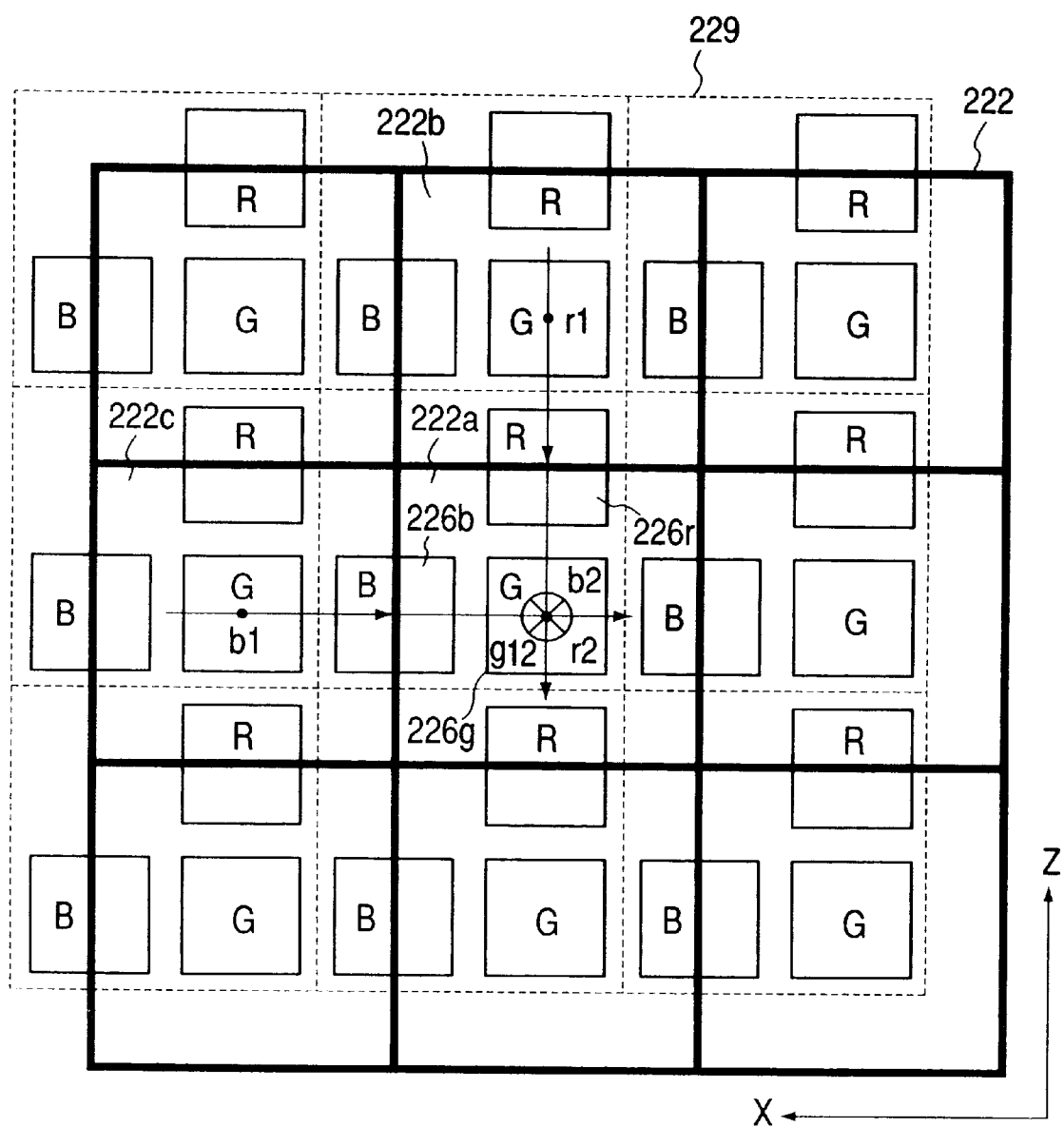
FIG. 9A is an enlarged plan view of the liquid crystal display panel of the second embodiment.

FIG. 9A is an enlarged top view partially showing the liquid crystal panel. A broken line lattice 229 indicates a collection of RGB pixels constituting a picture unit. Specifically, when RGB pixels are driven by the active matrix way illustrated in FIG. 4, the RGB pixel unit (picture unit) indicated by the broken line lattice 229 is driven by RGB image signals corresponding to the same pixel position. Consider now one picture unit constituted of the R pixel electrode 226r, G pixel electrode 226g, and B pixel electrode 226b. The R pixel electrode 226r is illuminated with the R light obliquely incident from the microlens 222b as described earlier and indicated by an arrow r1. The reflected R light is output from the microlens 222a as indicated by an arrow r2. The B pixel electrode 226b is illuminated with the B light obliquely incident from the microlens 222c as described earlier and indicated by an arrow b1. The reflected B light is output from the microlens 222a as indicated by an arrow b2. The G pixel electrode 226g is illuminated with the G light vertically incident (toward the back of the drawing sheet) from the microlens 222a as described earlier and indicated by an arrow g12. The reflected G light is output vertically (toward the front of the drawing sheet) from the microlens 222a. As described above, in the liquid crystal display panel of the embodiment, although the incident position of each primary color illumination light is different in the RGB pixel unit constituting one picture unit, the reflected light is output from the same microlens (in the above example, the microlens 222a). This is also true for all other picture units (RGB pixel units).

Figure 9B:
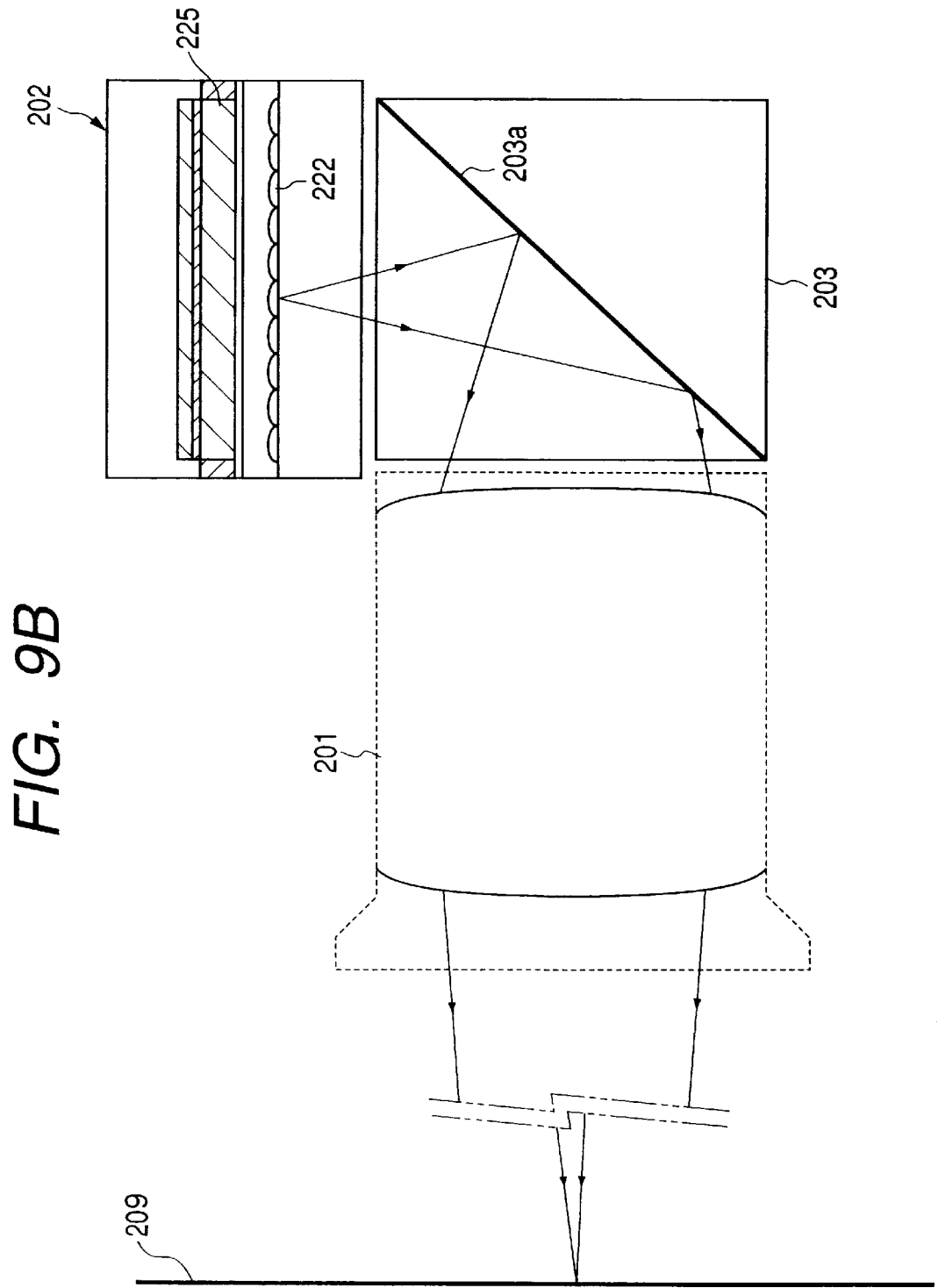
FIG. 9B is a diagram illustrating the optical configuration of a reflection type display device of the second embodiment.

As shown in FIG. 9B, in projecting all light fluxes output from the liquid crystal panel onto a screen 209 via PBS 203 and projector lens 201, the positions of microlenses are optically adjusted to be focussed on the screen 209. The projected image is constituted of picture units each containing mixed colors of light fluxes output from the RGB pixel unit constituting the picture unit in the lattice of the microlens array, i.e., the projected image is constituted of pixels on each of which three (RGB) color lights are collected. It is therefore possible to display a color image having a high image quality without RGB mosaic.

(Third Embodiment)

Figure 10:
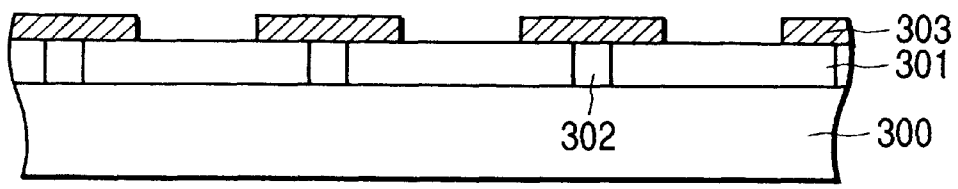
FIG. 10 is a schematic cross sectional view of a liquid crystal display device according to a third embodiment of the invention.

FIG. 10 shows the structure of reflection electrodes formed on an active matrix substrate of a liquid crystal display device according to the third embodiment.

In this embodiment, a low reflection region is formed by partially depositing low reflection insulating material on a high reflection electrode. Referring to FIG. 10, a matrix substrate 300 is formed with switching transistors and peripheral circuits for driving pixel reflection electrodes. On the matrix substrate 300, high reflection conductive films 301. used as pixel reflection electrodes and pixel separation regions 302 are formed in one layer. Black resin 303 is patterned on the high reflection conductive films, extending over the pixel separation regions at the peripheral areas of the high reflection conductive films. The black resin may be made of material commonly used as black matrix, and the thickness of the black resin is set to about 500 to 300 angstroms to provide sufficient low reflection regions. If the black resin is too thick, the rubbing process after the orientation film becomes difficult or disturbance of orientations of liquid crystals near at steps formed by the black resin is difficult to be suppressed. The thickness is therefore required to be set by taking into consideration of these process margins.

The advantageous effects of this embodiment are as follows:

(1) Since only a single layer is formed on a conventional structure of an active matrix substrate, the manufacture is easy.

(2) The low reflection regions can be formed freely through a patterning process.

(3) Resin excellent in light absorption can be used.

(4) Resin also functions as a light shielding material of the active matrix substrate.

Obviously, the embodiment is applicable to the optical system of the second embodiment.

(Fourth Embodiment)

Figure 11:
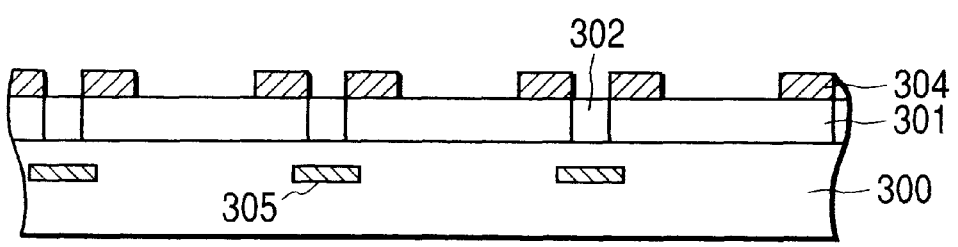
FIG. 11 is a schematic cross sectional view of a liquid crystal display device according to a fourth embodiment of the invention.

FIG. 11 shows the structure of reflection electrodes formed on an active matrix substrate of a liquid crystal display device according to the fourth embodiment.

In this embodiment, a low reflection region is formed by partially depositing low reflection conductive material on a high reflection electrode. Referring to FIG. 11, a matrix substrate 300 is formed with switching transistors and peripheral circuits for driving pixel reflection electrodes. On the matrix substrate 300, high reflection conductive films 301 used as pixel reflection electrodes and pixel separation regions 302 are formed in one layer. A low reflection conductive film 304 is patterned on the high reflection conductive films, in the peripheral areas of the high reflection conductive films. The material of the low reflection conductive film 304 may be Ti, TiN, Cr, Mo, W, Si compound thereof, and Si alloy thereof, similar to the first embodiment.

The thickness of the low reflection conductive film is determined depending upon a light shielding capability of metal. If Ti is used, the thickness of 200 to 1000 angstroms provides a low reflection of 30% or smaller. The influence of steps of the low reflection conductive film pattern is required to be taken into consideration, similar to the third embodiment. A light shielding film 302 for the active matrix substrate is formed in the substrate under the reflection electrodes, similar to conventional technologies.

The advantageous effects of this embodiment are as follows:

(1) The structure is simple.

(2) A low reflection region can be freely determined through a patterning process.

(3) A very thin low reflection film can be used.

Obviously, the embodiment is applicable to the optical system of the second embodiment.

(Fifth Embodiment)

Figure 12A:
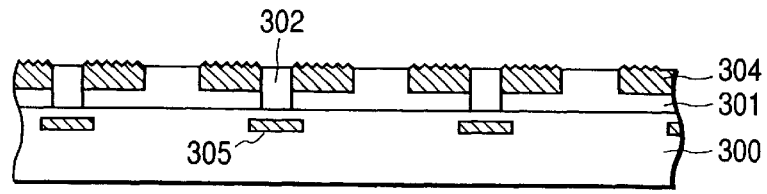
FIG. 12A is a schematic cross sectional view of a liquid crystal display device according to a fifth embodiment of the invention.

FIG. 12A shows the structure of reflection electrodes formed on an active matrix substrate of a liquid crystal display device according to the fifth embodiment.

In the structure of this embodiment, partial regions in the surface layer of reflection electrodes are replaced by low reflection conductive materials. The surface of the reflection electrode can be made generally flush. Referring to FIG. 12A, a matrix substrate 300 is formed with switching transistors and peripheral circuits for driving pixel reflection electrodes. The surface layer of high reflection conductive films 301 are partially etched to embed low reflection conductive materials 304. A pixel separation region 302 is generally flush with the surfaces of the low and high reflection electrodes.

Similar to the fourth embodiment, a light shielding film 305 for the matrix substrate is formed under the reflection electrode.

A manufacture method of the structure shown in FIG. 12A will be described.

Figure 12B:
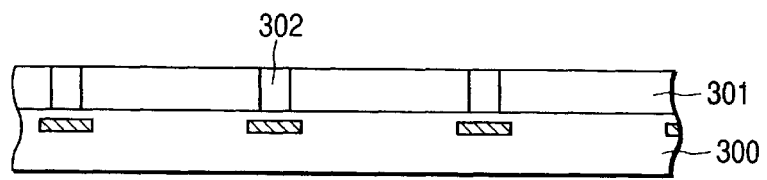
FIGS. 12B, 12C, 12D and 12E are cross sectional views illustrating the method of manufacturing a liquid crystal display device of the fifth embodiment.

FIG. 12B shows a planarized surface of a high reflection metal layer.

Figure 12C:
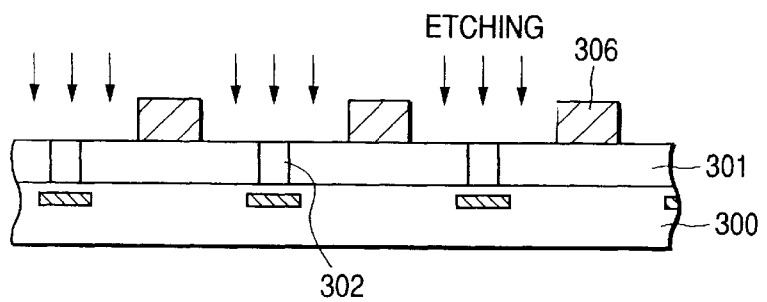

As shown in FIG. 12C, after a plasma nitride film 306 is deposited on the surface of the reflection metal layer, it is patterned to expose regions where low reflection regions are formed.

Figure 12D:
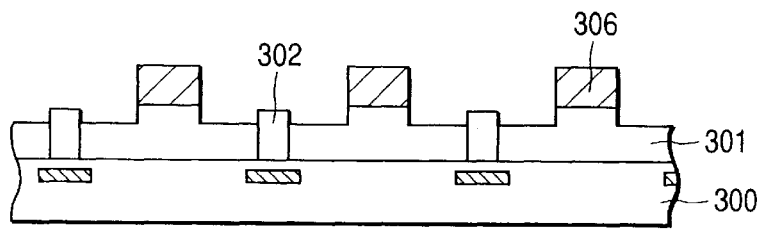

As shown in FIG. 12D, the high reflection metal layer 301 made of, for example, Al, is selectively etched through anisotropically.

Figure 12E:
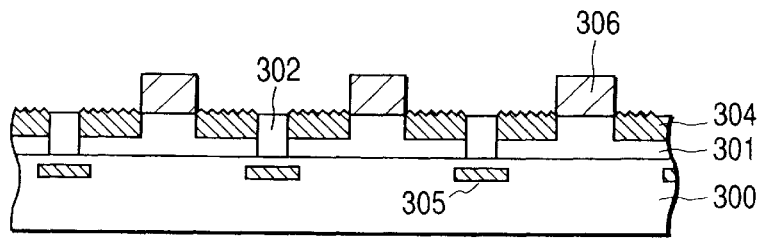
Figure 14A:
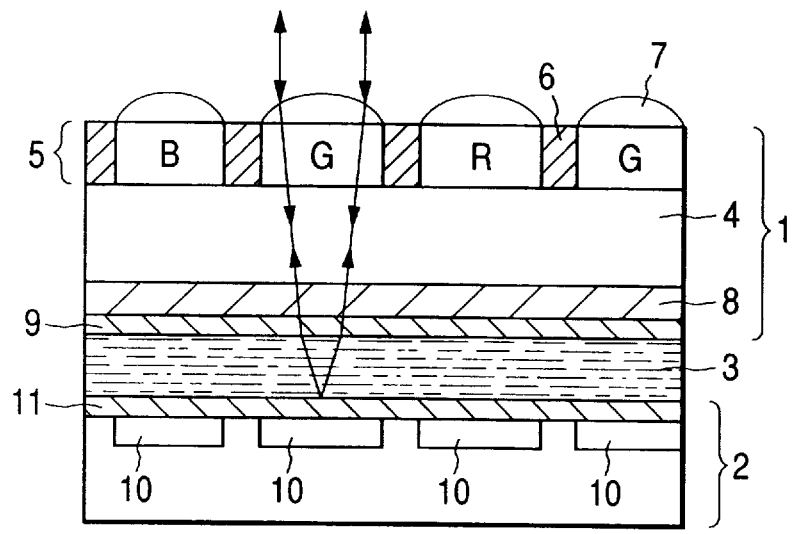
FIG. 14A is a schematic cross sectional view of a conventional liquid crystal display device.
Figure 14B:
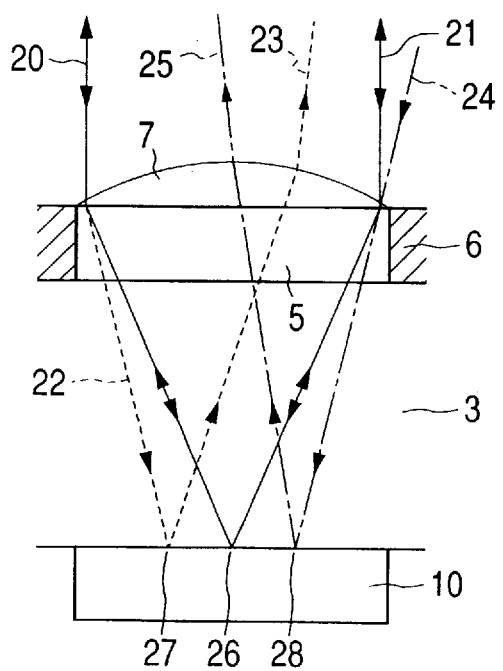
FIG. 14B shows the details of optical paths of one pixel of the liquid crystal display device shown in FIG. 14A.

As shown in FIG. 12E, after the high reflection metal layer 301 is etched to a thickness of several hundred angstroms, the regions where Al was etched are filled with low reflection metal 304 through selective metal growth.

The material of the low reflection metal 304 is preferably W whose deposition process is technically mature. However, any other low reflection metals may be used. Lastly, the remaining plasma nitride film is removed to complete a desired structure.

The advantageous effects of this embodiment are as follows:

(1) Since the surface is generally flush, the rubbing process for liquid crystals can be performed uniformly over the whole surface of the liquid crystal panel. Therefore, the control of orientations or liquid crystals is easy.

(2) If W is used, in addition to a low reflectivity of W, the formed rough surface can further lower the reflectivity.

(Sixth Embodiment)

Figure 13:
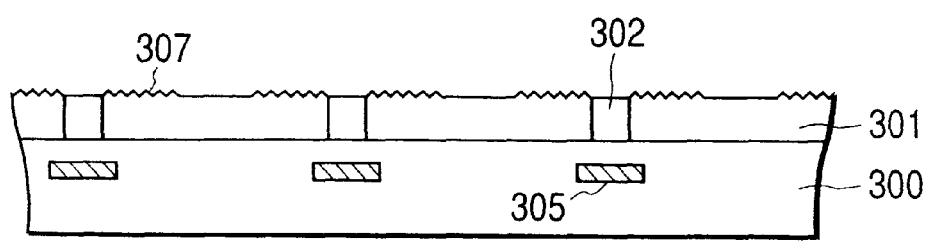
FIG. 13 is a schematic cross sectional view of a liquid crystal display device according to a sixth embodiment of the invention.

FIG. 13 shows the structure of an active matrix substrate according to the sixth embodiment of the invention. In this embodiment, a high reflection metal region 301 having a rough surface is used as the low reflection region.

Referring to FIG. 13, on a matrix substrate 300, high reflection electrodes 301 and pixel separation regions 302 generally flush with the electrodes are formed. Partial surfaces 307 of the high reflection electrodes 301 are made rough so that scattering becomes strong and mirror reflection components become less.

In order to make the surface of the high reflection electrode 301 rough, after the surface of the high reflection electrode 301 is planarized, a resist pattern is formed on the high reflection electrode 301 to expose the partial surfaces 307 which are made irregular, and the substrate is exposed to Ar plasma at a power of 300 W to 1 kW. With this method, the surface reflectivity was made 30% or lower.

The advantageous effects of this embodiment are as follows:

(1) Since the surface is generally flush, the rubbing process can be performed uniformly so that crystal orientation control is easy.

(2) Manufacture processes are easy.

As described so far, according to the present invention, it is possible to prevent a contrast to be lowered by variations of aberrations and shapes of microlenses and to provide a high image quality display device. Further, it is possible to provide a high image quality display device capable of preventing stray light in an optical system from being mixed with a displayed image. Still further, it is possible to provide a display device of low cost and improved image quality.

What is claimed is:

1. A reflection type liquid crystal display device, comprising:

a first substrate having an array of a plurality of light reflecting pixel electrodes, each of which includes a high reflectivity pixel electrode region near a focal point upon which light incident upon a microlens is focussed, and a low reflectivity pixel electrode region surrounding the high reflectivity pixel electrode region such that surfaces of the high and low reflectivity pixel electrode regions are formed on the same plane;

a second substrate having an array of a plurality of microlenses; and liquid crystals sandwiched between said first and second substrates for modulating incident light entering between said first and second substrates and reflected by the light reflecting pixel electrodes to form an optical display, wherein the high reflectivity pixel electrode region reflects incident light and the low reflectivity pixel electrode region limits a reflection of incident light components of stray light caused by aberration among light passed through the microlens.

2. A reflection type liquid crystal display device according to claim 1, wherein a light reflectivity of the high reflectivity region is in a range from 100% to 60%.

3. A reflection type liquid crystal display device according to claim 1, wherein a light reflectivity of the high reflectivity region is in a range from 100% to 80%.

4. A reflection type liquid crystal display device according to claim 1, wherein a light reflectivity of the low reflectivity region is 50% or lower.

5. A reflection type liquid crystal display device according to claim 1, wherein a light reflectivity of the low reflectivity region is 30% or lower.

6. A reflection type liquid crystal display device according to claim 1, wherein the high reflectivity region is made of aluminum.

7. A reflection type liquid crystal display device according to claim 1, wherein the high reflectivity region is made of alloy of aluminum and silicon.

8. A reflection type liquid crystal display device according to claim 1, wherein the low reflectivity region is made of titanium.

9. A reflection type liquid crystal display device according to claim 1, wherein the low reflectivity region is made of titanium nitride.

10. A reflection type liquid crystal display device according to claim 1, wherein the low reflectivity region is made of chrome.

11. A reflection type liquid crystal display device according to claim 1, wherein the low reflectivity region is made of molybdenum.

12. A reflection type liquid crystal display device according to claim 1, wherein the low reflectivity region is made of tungsten.

13. A reflection type liquid crystal display device according to claim 1, wherein the low reflectivity region is made of silicon added alloy of titanium, titanium nitride, chrome, molybdenum, or tungsten.

14. A reflection type liquid crystal display device according to claim 1, wherein the high reflectivity region is formed in a central area of each of the pixel electrodes and surrounded two-dimensionally by the low reflectivity region.

15. A reflection type liquid crystal display device according to claim 1, wherein the high reflectivity region is made of a high reflectivity first conductive material and the low reflectivity region is made of a low reflectivity second conductive material.

16. A reflection type liquid crystal display device according to claim 1, wherein the high reflectivity region is made of a conductive material and the low reflectivity region is made of a material laminated on the conductive material, the material having a reflectivity lower than the conductive material.

17. A reflection type liquid crystal display device according to claim 1, wherein the high reflectivity region has a high reflectivity surface configuration and the low reflectivity region has a low reflectivity surface configuration providing a lower reflectivity than the high reflectivity region.

18. A projection type liquid crystal display device using a reflection type liquid crystal display device recited in any one of claims 1 to 17.

19. A projection type liquid crystal display device according to claim 18, comprising at least three liquid crystal panels for three colors wherein blue light is separated by a high reflection mirror and a blue light reflection dichroic mirror, and red and green light are separated by a red light reflection dichroic mirror and a green light/blue light reflection dichroic mirror to illuminate each liquid crystal panel.

* * * * *

UNITED STATES PATENT AND TRADEMARK OFFICE
CERTIFICATE OF CORRECTION

PATENT NO. : 6,172,723 B1
DATED : January 9, 2001
INVENTOR(S) : Shunsuke Inoue et al.

It is certified that error appears in the above-identified patent and that said Letters Patent is hereby corrected as shown below:

Title page,
Item [57], ABSTRACT,
Line 9, "near at" should read -- near --.

Column 1,
Line 28, "to" should read -- is --.

Column 2,
Line 1, "at" should be deleted;
Line 25, "near at" should read -- near --;
Line 37, "project" should read -- projected --; and
Line 62, "near in generally" should read -- generally near --

Column 4,
Line 51, "twist" should read -- twisted --.

Column 6,
Line 59, "to" should be deleted.

Column 7,
Line 32, "are" should read -- is --; and
Line 62, "RGS" should read -- RGB --.

Column 8,
Line 40, "BIG" should read -- B/G --.

Column 9,
Line 18, "and" should read -- and is --; and
Line 59, "Just" should read -- just --.

Column 10,
Line 6, "tan e" should read -- $\tan \theta$ --.

UNITED STATES PATENT AND TRADEMARK OFFICE
CERTIFICATE OF CORRECTION

PATENT NO. : 6,172,723 B1
DATED : January 9, 2001
INVENTOR(S) : Shunsuke Inoue et al.

It is certified that error appears in the above-identified patent and that said Letters Patent is hereby corrected as shown below:

Column 11,
Line 7, "301." should read -- 301 --; and
Line 17, "near at steps" should read -- near steps --.

Column 12,
Line 11, "are" should read -- is --;
Line 26, "through" should be deleted.

Signed and Sealed this

Twenty-ninth Day of January, 2002

Attest:

Attesting Officer

JAMES E. ROGAN
Director of the United States Patent and Trademark Office